United States Patent [19]

Suggitt

[11] Patent Number: 4,671,803
[45] Date of Patent: Jun. 9, 1987

[54] PROCESS FOR PRODUCING SYNTHESIS GAS FREE-FROM VOLATILE METAL HYDRIDES

[75] Inventor: Robert M. Suggitt, Wappingers Falls, N.Y.

[73] Assignee: Texaco Development Corp., White Plains, N.Y.

[21] Appl. No.: 878,739

[22] Filed: Jun. 26, 1986

[51] Int. Cl.$^4$ .................. C10J 3/46; C10K 1/02; C10K 1/06; C10K 1/32

[52] U.S. Cl. .................. 48/197 R; 48/206; 48/215; 75/26; 252/373; 423/210; 423/244 R; 423/215.5

[58] Field of Search .................. 48/197 R, 202, 206, 48/210, 212, 215; 252/373; 423/244 R, 248, 215.5, 210, 648; 75/26; 55/72, 99

[56] References Cited

U.S. PATENT DOCUMENTS

| | | | |
|---|---|---|---|
| 3,544,291 | 12/1970 | Schlinger et al. | 252/373 |
| 4,235,625 | 11/1980 | Tippner | 262/373 |
| 4,247,382 | 1/1981 | Woldy et al. | 48/206 |
| 4,464,183 | 8/1984 | Arisaki | 48/210 |
| 4,478,798 | 10/1984 | Karwat | 55/72 |
| 4,578,256 | 3/1986 | Nishino et al. | 55/72 |
| 4,593,148 | 6/1986 | Johnson et al. | 423/210 |

*Primary Examiner*—Peter Kratz
*Attorney, Agent, or Firm*—Robert A. Kulason; James J. O'Loughlin; Albert Brent

[57] ABSTRACT

Process for producing synthesis gas, reducing gas, or fuel gas substantially free-from volatile metal hydride impurities e.g. a hydride of arsenic, germanium, antimony, lead, tin, silicon, and mixtures thereof starting with the partial oxidation of liquid hydrocarbon fuel and/or solid carbonaceous fuel containing at least one mtal impurity from Group IV A and V A of the Periodic Table of Elements. At least one intermetallic reaction product of said metal impurity from Group IV A and V A leaves the gas generator in admixture with the hot raw process gas stream. A metal hydride forms when the gas stream is quench cooled and scrubbed with water. The metal hydride is then decomposed into its elements e.g. $H_2$ and a Group IV A aor V A metal when the cooled and scrubbed gas stream contacts a solid sorbent material having a minimum surface area of 10 square meters per gram in a gas-solids contacting zone at a temperature in the range of about 0° C. to 350° C., a pressure in the range of about 1 to 250 atmospheres, and a space velocity in the range of about 300 to 10,000 standard cubic feed per hour dry gas feed per cubic foot of solid sorbent material. The metallic portion of the decomposed hydride is deposited on the solid sorbent contacting material in the elemental form or as the sulfide or oxide. A stream of synthesis gas, reducing gas, or fuel gas, substantially free-from volatile metal hydrides is removed from the gas-solids contacting zone in admixture with the hydrogen produced in the decomposing step. Poisoning of downstream catalyst beds and clogging of heat exchanger tubes are thereby avoided. Valuable rare metals may be recovered from fossil fuels by the subject process.

14 Claims, No Drawings

PROCESS FOR PRODUCING SYNTHESIS GAS FREE-FROM VOLATILE METAL HYDRIDES

FIELD OF THE INVENTION

This invention relates to the partial oxidation of liquid hydrocarbonaceous and solid carbonaceous fuels for the production of gaseous mixtures comprising synthesis gas, reducing gas, or fuel gas. More particularly, it is concerned with a process for the partial oxidation of liquid hydrocarbonaceous fuel or solid carbonaceous fuels containing Group IV A or V A metallic impurities and the production of gaseous mixtures comprising $H_2+CO$ free-from volatile metal hydrides. Another aspect of this invention is to recover valuable rare metals such as arsenic, antimony and germanium from a fossil fuel.

Recent findings infer that arsenic and other Group IV A and V A metals from the periodic Table of Elements may be present in volatile form in water scrubbed synthesis gas at relatively low temperatures when the synthesis gas is produced by the partial oxidation of some types of coal. A deposit containing 87 percent arsenic, 1.1 percent silicon and trace amounts of lead and tin was found in a gas heat exchanger that cooled synthesis gas from approximately 132° C. to 54° C. Arsenic and lead may cause stress corrosion of the blades in a gas turbine that is operated by fuel gas derived from such contaminated coal. Further, down-stream beds of catalyst e.g. water-gas shift, methanol synthesis may be poisoned by synthesis gas containing trace contaminants of these metals. These and other problems including environmental pollution are avoided by the subject process.

SUMMARY

In accordance with certain of its aspects, this invention is directed to an improved partial oxidation process for the production of gaseous mixtures comprising $H_2$, CO, and other gaseous materials e.g. synthesis gas, reducing gas, or fuel gas which are substantially free from volatile metal hydride impurities even though the liquid hydrocarbon or solid carbonaceous fuel feed to the gas generator contains at least one metal impurity selected from Group IV A and V A of the Periodic Table of Elements. The metal impurities may be selected from the group consisting of As, Ge, Sb, Pb, Sn, Si, and mixtures thereof. The process comprises the steps of:

(1) reacting in a free-flow partial oxidation reaction zone a fuel feed selected from the group consisting of liquid hydrocarbon fuel, solid carbonaceous fuel, and mixtures thereof with a free-oxygen containing gas in the presence of a temperature moderator at a temperature in the range of about 950° C. to 1925° C. and a pressure in the range of about 1 to 250 atmospheres to produce a raw stream of synthesis gas, reducing gas, or fuel gas; wherein said fuel feed contains at least one metal impurity comprising a Group IV A or V A element selected from the group consisting of As, Ge, Sb, Pb, Sn, Si and mixtures thereof; and said raw gas stream includes $H_2O$, entrained matter, and reaction products of said metal impurities;

(2) cooling and scrubbing the hot raw gas stream from (1) by direct contact with water in a cooling and scrubbing zone to reduce its temperature to a value in the range of about 50° C. to 300° C., and to remove said entrained matter; wherein said reaction products of said metal impurities are converted into volatile metal hydrides;

(3) contacting the raw gas stream from (2) in a gas-solids contacting zone with a solid sorbent material having a minimum surface area of 10 square meters per gram, at a space velocity in the range of about 300 to 20,000 standard cubic feet of gas (dry basis) per lb. of solid sorbent material per hour; and decomposing such as by disproportionating the volatile metal hydrides in said raw gas stream into their elements comprising hydrogen gas and at least one of said Group IV A and V A metals;

(4) depositing on said sorbent material the Group IV A or V A metal entrained in the raw gas stream from (3) in elemental form or as the sulfide or oxide; and (5) removing the gas stream from the gas-solids contacting zone in (3) substantially free-from volatile metal hydrides and in admixture with the supplemental hydrogen produced in (3).

DESCRIPTION OF THE INVENTION

The present invention relates to an improved partial oxidation process for producing gaseous mixtures comprising $H_2+CO$ e.g. synthesis gas, reducing gas, or fuel gas which is substantially free from volatile trace metal hydrides. The feed to the partial oxidation gas generator substantially comprises liquid hydrocarbon fuel or solid carbonaceous fuel containing trace amounts of Group IV A and/or Group V A amphoteric metal impurities. These amphoteric metals react with basic active metals such as alkaline metals or alkaline earth materials present in the ash which is introduced into the gasifier as a part of the fuel feed to from intermetallic compounds. For example, sodium and/or calcium arsenide may be produced in the gas generator. This reaction is unexpected since because of the strong reducing atmosphere in the gas generator, one would assume that the elemental form of the amphoteric metal would be present in the gasifier rather than the intermetallic compounds. Hydrolysis of the intermetallic compounds takes place next in a cooling and scrubbing zone at a reduced temperature e.g. 50° C. to 300° C. to produce volatile metal hydrides. At least one volatile metal hydride from the group consisting of arsine, silane, germanes, stibine, stannane, and lead hydride leaves the cooling and scrubbing zone in admixture with the raw stream of synthesis gas, reducing gas, or fuel gas.

It is necessary to remove the trace metal hydrides from synthesis gas in order to prevent fouling of heat exchangers and poisoning of downstream beds of catalyst. Further, atmospheric pollution, hazardous exposure to workers when vessels and other equipment are opened, and serious metallurgical problems are thereby avoided.

The previously described partial oxidation reaction takes place in a refractory lined free-flow reaction zone of a vertical steel pressure vessel or gas generator at a temperature in the range of about 950° C. to 1925° C., such as about 1093° C. to 1427° C., and a pressure in the range of about 1 to 250 atmospheres such as about 3 to 170 atmospheres. The atoms of free-oxygen containing gas plus the atoms of organically combined oxygen in the solid carbonaceous fuel to atoms of carbon in the fuel (O/C atomic ratio) is in the range of about 0.7 to 1.6, such as about 0.9 to 1.1. The weight ratio of $H_2O$/fuel is in the range of about 0.67 to 2.4. The reaction time in the gas generator is in the range of about 0.5 seconds to 10 minutes, such as about 1.0 second to 1 minute.

The effluent stream of raw synthesis gas leaving the gas generator comprises $H_2$, $CO$, $H_2O$; at least one reaction product of a metal selected from the group consisting of As, Ge, Sb, Pb, Sn, and Si; at least one material from the group $CO_2$, $H_2S$, $COS$, $CH_4$, $N_2$, Ar, $NH_3$; and entrained matter comprising at least one material from the group slag, ash, particulate carbon and unconverted fuel. The gaseous composition of the raw synthesis gas in mole % may be as follows: $H_2$ 10.0 to 68.0, CO 15.0 to 60, $H_2O$ 2.0 to 50.0, $CO_2$ 3.0 to 30.0 $CH_4$ 0.0 to 28.0, $H_2S$ 0.0 to 5, COS 0.0 to 0.3, $N_2$ 0.0 to 60.0, Ar 0.0 to 1.8, and $NH_3$ 0 to 0.2. Unconverted solid fuel and ash may be entrained in the gas stream in the amount of about 0.2 to 40 weight percent (basis weight of fuel). The amount of each element present in the gas mixture determines the use of the gas mixture, for example as a synthesis gas (mixtures of $H_2+CO$), reducing gas (high $H_2$ and CO), or fuel gas (high $H_2$, CO and $CH_4$).

Compounds of at least one Group IV A and V A amphoteric metal of the Periodic Table of Elements may be found in the liquid hydrocarbon fuel and solid carbonaceous fuel as impurities. These amphoteric metals include arsenic, germanium, antimony, tin, lead, silicon and mixtures thereof. These metallic impurities are present in the fuel feedstock in the amount of about 0.1 to 250 parts per million by weight (ppm), such as about 0.2 to 100 ppm. Liquid hydrocarbon fuels that may contain said metallic impurities include by definition reduced crude, tar-sand oil, shale oil, coal derived oil, coal tar, and vacuum resid. Solid carbonaceous fuels that may contain said metallic impurites include by definition coal i.e. anthracite, bituminous, sub-bituminous, lignite, or peat; particulate carbon; coke from coal; petroleum coke; oil shale; tar sands; asphalt; pitch; and mixtures thereof. Arsenic is a particularly troublesome impurity when present in the fuel feed. About 0.1 to 100 ppm of arsenic, basis coal, may be present in different types of coal. A common form of arsenic is mispickel in which arsenic is combined with iron or nickel and with sulfur. It may be surmised that the arsenic content of a coal is related to its iron content. Hence eastern U.S. coals with a high content of pyrites are more likely to contain larger amounts of arsenic than western coals which are low in iron. In the generator, arsenic is believed to combine in the highly reducing atmosphere with electropositive elements such as sodium, potassium or magnesium to generate arsenides. With a rapid temperature quench, these arsenides can survive to react with liquid phase water to generate arsines e.g. $As_2H_4$ and $AsH_3$ which are thermodynamically stable only at low temperatures. When slow cooling is involved, these arsenides if exposed to steam can hydrolyze at higher temperatures and any arsine formed is immediately destroyed by decomposition into the elements. Accordingly, partial oxidation plants which operate with waste heat boilers are less apt to have downstram arsenic contamination problems than partial oxidation plants utilizing a quench operation. Hence, depending upon the arsenic content of the coals involved, it may be anticipated that a buildup of arsenic may occur on water-gas shift catalysts. In another example, eastern coal such as Pittsburgh Seam or Illinois No. 6 may be gasified to produce fuel gas for burning in gas turbines. When the hot raw gas stream from the gas generator is directly quench cooled in water, traces of arsine may survive until the acid-gas scrubbed fuel gas is reheated prior to combustion in the gas turbines.

When a fuel gas heater is used to rewarm the particulate and sulfur scrubbed fuel gas to a temperature of about 316° C., decomposition of any residual arsine in the fuel gas can take place and arsenic could deposit out. This problem is avoided by applicants' process by which the arsenic is removed from the fuel gas stream.

Although the hydride of arsenic, arsine, is generally the most troublesome volatile metal hydride to be found in synthesis gas, other metals can also be transported as volatile hydrides in synthesis gas. Examples include stibine $SbH_3$, silane $SiH_4$, disilane $Si_2H_6$, germane $GeH_4$, digermane $Ge_2H_6$, and trigermane $Ge_3H_8$, stannane $SnH_4$, and lead hydride. Antimony is found in trace amounts in many high sulfur coals. Germanium has been detected in some brown coals and has been reported in significant concentrations in some specific anthracites. Germanium with its uses in the semi-conductor electronic and optic fields is a high value material and may be recovered by the subject process.

Low concentrations of the volatile hydrides of arsenic, antimony, germanium and tin are kinetically stable at low temperatures (less than 0° C.) but become increasingly unstable with rising temperature. The hydrides of bismuth and lead are very unstable, even at 0° C., but minute amounts of lead may be transported downstream in fast flowing synthesis gas as a metal hydride. Since bismuth hydride is so unstable that its existence is questionable, it is doubtful that bismuth is carried downstream is measurable amounts by a flow of synthesis gas.

Even though coal ash contains large amounts of silicon, only small traces of silicon have been found in particulate-free synthesis gas as evidenced by downstream deposits of silicon and silicon-rich particulates in combustion gases. Small amounts of silicides of magnesium or other metals can form in the gasifier. Silicides can then generate volatile silanes on contacting water at quench temperatures, particularly when the quench water is slightly acidic.

Similarly, any silicides, antimonides, germanides and plumbides, if exposed to the steam laden synthesis gas would have time to hydrolyze to form the hydrides which then decompose to the elements at high temperatures. If these intermetallic agents were to remain encapsulated by slag during cooling they can survive. Thus, even with waste heat boiler operation, there is no assurance that metal hydrides would not appear in downstreams equipment. It is possible that aggregates of the hot slag shatter on contacting liquid water with the result that the intermetallic compounds are then exposed to water and hydrolyze to form the respective metal hydrides. Thus, while these materials are more likely to be present in synthesis gas cooled by a direct quench mode of operation, metal hydrides can be present in synthesis gas in waste heat boiler operations where the slag is more slowly cooled allowing the breakdown of intermetallic compounds to form elemental forms of arsenic, antimony, germanium, silicon, tin, etc. or their sulfides or oxides via subsequent reactions with hydrogen sulfide or water.

The liquid hydrocarbon and solid carbonaceous feed may be at room temperature or it may be preheated to a temperature up to as high as about 300° C. The feed may be introduced into the gas generator by way of a burner in liquid phase or in a vaporized mixture with a temperature moderator. Suitable temperature moderators include steam, water, $CO_2$-rich gas, nitrogen in air, by-product nitrogen from a conventional air separation unit, and mixtures of the aforesaid temperature moderators. The temperature moderator may be introduced in admixture with the fuel stream, the free-oxygen containing stream, or both. Alternatively, the temperature moderator may be introduced into the reaction zone of the gas generator by way of a separate conduit in the fuel burner.

The term free-oxygen containing gas, as used herein is intended to include air, oxygen-enriched air, i.e. greater than 21 mole % oxygen, and substantially pure oxygen, i.e. greater than 95 mole % oxygen (the remainder comprising $N_2$ and inert gases such as argon). The amount of nitrogen in the product gas may be decreased by reacting substantially pure oxygen or oxygen enriched air in the gas generator in place of air. Free-oxygen containing as may be introduced into the burner at a temperature in the range of about ambient to 200° C.

The hot raw effluent gas stream exits from the partial oxidation gas generator and is cooled to a temperature in the range of about 50° C. to 300° C., such as less than about 150° C. For example, the hot gas stream may be first partially cooled by direct contact with water contained in a quench tank, such as shown in coassigned U.S. Pat. No. 4,218,423, which is incorporated herein by reference. Any molten slag in the hot raw synthesis gas stream is solidified by the quench water. Most of the ash, slag and unreacted carbonaceous fuel are transferred to the water in the quench tank. The partially cooled gas stream may be then passed through a water scrubbing operation to remove any remaining entrained particulate matter. The pressure in the quench tank is substantially the same as in the gas generator located above the quench tank. A portion of the quench water at the bottom of the quench tank is removed by way of a lock hopper system and settler, such as shown in coassigned U.S. Pat. No. 3,544,291, which is incorporated herein by reference. Alternatively, the hot raw effluent gas stream from the reaction zone may be partially cooled, by indirect heat exchange, prior to being scrubbed with water, by being passed through a radiant or convection gas cooler, such as shown in coassigned U.S. Pat. No. 4,247,302 which is incorporated herein by reference. The metal hydrides can form wherever the solid material containing intermetallic compounds of the Group IVA and VA elements contact water e.g. quench tank and/or water scrubber and the hydrides can then be transferred to the synthesis gas.

The water scrubbed synthesis gas, reducing gas, or fuel gas is passed through a vessel containing a solid sorbent material. The sorbent is preferably a non-hydrating material, such as carbonaceous material. The contacting temperature is in the range of about 0° C. to 350° C. with a preferred temperature range of about 50° C.–250° C. for optimum performance. Conventional coolers, heaters and heat exchangers may be used if it is necessary to adjust the temperature of the gas stream. The pressure in the gas solids contacting zone is preferably the same as that in the gasifier less normal pressure drop in the lines and equipment. The sorbent material is contained in at least one contacting bed. In one embodiment, a plurality of beds, such as two, are used. For example, two beds may operate in series at different temperatures. The preferred temperature of operation is dependent upon the elements to be collected. Somewhat lower temperatures, e.g., 0° C. to 200° C. are appropriate if an element from the group consisting of antimony, arsenic, tin, lead, and mixtures thereof is to be removed from the gas stream. A somewhat higher temperature range, namely, 200° C.–350° C. is preferable in a second bed to insure the removal of silicon, germanium, and mixtures thereof from the stream of synthesis gas, reducing gas, or fuel gas. In one embodiment, the acid-gases e.g. $CO_2$, $H_2S$ and COS are removed between the first and second beds of sorbent material by conventional processing.

The preferable solid sorbent material, contacted in the gas-solids contacting, decomposing or disproportionating zone by the cooled and scrubbed raw gas stream, comprises more than 90.0 wt. % of carbon when the contacting wet gas stream contains vaporized water with a partial pressure that is greater than 0.05 of the saturation pressure of water at the contacting temperature. The preferred hydrophobic sorbent material for a wet gas stream is selected from the group consisting of charcoal, graphite, activated carbon, and mixtures thereof. If the contacting gas stream is dry i.e. contains vaporized water with a partial pressure that is less than 0.05 of the saturation pressure of water at the contacting temperature, the preferred solid sorbent is selected from the group consisting of a carbonaceous material comprising more than 90 wt. % of carbon, silica, alumina, silica-aluminas, silica-magnesias, and mixtures thereof. The carbonaceous material in the aforesaid group is preferably selected from the group consisting of charcoal, graphite, activated carbon, and mixtures thereof. The minimum surface area of the sorbent contact material is 10 square meters per gram, such as about 50 to 500 $m^2$/gm. The space velocity in the gas-solids contacting zone is in the range of about 300 to 20,000, such as about 1,000 to 5,000 standard cubic feet of gas (dry basis) per pound of solid carbonaceous material per hour. The particle size of pellets of the sorbent material is from about 1/16″ to ¾″ diameter. In one embodiment the solid sorbent material is impregnated or doped with a small amount e.g. about 0.5 to 1.0 wt. % of a metal from Group IV A or V A e.g. As, Sb to serve as an initiating catalyst for effecting the decomposition of the metal hydride. Advantageously, by the subject process, the solid sorbent material efficiently scavenges the Group IV A or V A metal from the synthesis gas, reducing gas, or fuel gas without reducing the carbon monoxide content of the raw process gas stream.

Any suitable conventional gas-solids contacting zone may be used in the disproportionating of the metal hydride. For example, beds of the Group IV A and V A—metal trapping material may be placed in drums or tanks located upstream from catalyst beds, heat exchangers, or solvent-gas purification systems that are to be safe-guarded from contamination. Further, particles of the solid sorbent contacting material may be fluidized by the upwardly velocity of the synthesis gas, reducing gas, or fuel gas passing through a fluidized-bed system of the type described in Perry's Chemical Engineers' Handbook, Perry, Chilton, and Kirkpatrick, Fourth Edition, McGraw-Hill Book Co. pages 20-42 to 20-53, which is incorporated herein by reference.

Advantageously, in one embodiment the Group IV A or V A metal deposited on the solid sorbent material may be recovered as a valuable by-product in a conventional metals recovery zone. For example, the high purity carbon portion of a solid carbonaceous contact material may be burned away to generate the oxide of the Group IV A or V A metal. By this means, valuable rare metals such as arsenic, antimony and germanium may be recovered from fossil fuels.

Although modifications and variations of the invention may be made without departing from the spirit and scope thereof, only such limitations should be imposed as are indicated in the appended claims.

I claim:

1. A process comprising the steps of:
   (1) reacting in a free-flow partial oxidation reaction zone a fuel feed selected from the grup consisting of liquid hydrocarbon fuel, solid carbonaceous fuel, and mixtures thereof with a free-oxygen containing gas in the presence of a temperature moderator at a temperature in the range of about 950° C. to 1925° C. and a pressure in the range of about 1 to 250 atmospheres to produce a raw stream of synthesis gas, reducing gas, or fuel gas; wherein said fuel feed contains at least one metal impurity comprising a Group IV A or V A element selected from the group consisting of As, Ge, Sb, Pb, Sn, Si, and mixtures thereof; and said raw gas stream includes $H_2O$, entrained matter; and reaction products of said metal impurities;
   (2) cooling and scrubbing the hot raw gas stream from (1) with water to reduce its temperature to a value in the range of about 50° C. to 300° C. and to remove said entrained matter; wherein said reaction products of said metal impurities are converted into volatile metal hydrides;
   (3) contacting the raw gas stream from (2) in a gas-solids contacting zone with a solid sorbent material having a minimum surface area of 10 square meters per gram, at a space velocity in the range of about 300 to 20,000 standard cubic feet of gas (dry basis) per lb. of solid material per hour; and decomposing the volatile metal hydrides in said raw gas stream into their elements comprising hydrogen gas and at least one of said Group IV A and V A metals;
   (4) depositing on said sorbent material the Group IV A or V A metal entrained in the raw gas stream from (3) in elemental form or as the sulfide or oxide; and
   (5) removing the gas stream from the gas-solids contacting zone in (3) substantially free-from volatile metal hydrides and in admixture with the supplemental hydrogen produced in (3).

2. The process of claim 1 wherein said volatile metal hydrides produced in (2) are selected from the group consisting of arsine, germane, stibine, lead hydride, stannane, silane, and mixtures thereof.

3. The process of claim 1 wherein said solid sorbent material in (3) comprises more than 90.0 wt. % of carbon.

4. The process of claim 1 wherein said solid sorbent material in (3) is selected from the group consisting of charcoal, graphite, activated carbon, and mixtures thereof.

5. The process of claim 1 wherein the raw gas stream in (3) is dry and the solid sorbent is selected from the group consisting of a carbonaceous material comprising more than 90 wt. % carbon, silica, alumina, silica-aluminas, silica-magnesias, and mixtures thereof.

6. The process of claim 1 wherein said solid sorbent material in (3) comprises pellets having a diameter of about 1/16 to ¾ inch.

7. The process of claim 1 provided with the steps of recovering said Group IV A or V A metal deposited on said solid sorbent material in (4) in a metals recovery zone.

8. The process of claim 1 wherein the solid sorbent material in (3) is impregnated with a metal from Group IV A or V A of the Periodic Table of Elements.

9. The process of claim 1 wherein the hot raw gas stream from (1) comprises $H_2$, CO, $H_2O$; at least one material from the group $CO_2$, $H_2S$, COS, $CH_4$, $N_2$, Ar, $NH_3$; at least one material from the group slag, ash, particulate carbon, and unconverted fuel; and at least one reaction product of a metal selected from the group consisting of As, Ge, Sb, Pb, Sn, and Si.

10. The process of claim 1 where in (3) said raw gas stream from (2) passes up through a fluidized-bed of said solid sorbent material.

11. The process of claim 1 wherein the gas-solids contacting zone in (3) comprises two beds of said solid sorbent material in series, and a metal selected from the group consisting of antimony, arsenic, tin, lead, and mixtures thereof is removed at a temperature in the range of about 0° C. to 200° C. from the gas stream in the first bed; and a metal selected from the group consisting of silicon, germanium, and mixtures thereof is removed at a temperature in the range of about 200° C. to 350° C. from the gas stream in the second bed.

12. The process of claim 11 with the additional step of removing acid-gases selected from the group consisting of $CO_2$, $H_2S$, COS, and mixtures thereof, from the gas stream prior to said gas stream entering said second bed.

13. The process of claim 1 where the solid sorbent material is contacted in (3) by the raw gas stream at a temperature in the range of about 0° C. to 350° C.

14. The process of claim 1 where the solid sorbent material is contacted in (3) by the raw gas stream at temperature in the range of about 50° C. to 250° C.

* * * * *